(12) United States Patent
Hazzani (10) Patent No.: US 10,134,262 B2
(45) Date of Patent: *Nov. 20, 2018

(54) SYSTEM AND METHOD FOR PREDICTION OF THREATENED POINTS OF INTEREST

(71) Applicant: Verint Systems Ltd., Herzliya Pituach (IL)

(72) Inventor: Gideon Hazzani, Rishon Le Zion (IL)

(73) Assignee: VERINT SYSTEMS LTD., Herzilya, Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,501

(22) Filed: Feb. 15, 2017

(65) Prior Publication Data

US 2017/0213444 A1    Jul. 27, 2017

Related U.S. Application Data

(63) Continuation of application No. 13/868,223, filed on Apr. 23, 2013, now Pat. No. 9,607,500.

(30) Foreign Application Priority Data

Apr. 23, 2012 (IL) .......................................... 219362

(51) Int. Cl.
G08B 1/08       (2006.01)
G08B 23/00    (2006.01)
(Continued)

(52) U.S. Cl.
CPC ......... *G08B 23/00* (2013.01); *G06K 9/00288* (2013.01); *G08B 31/00* (2013.01);
(Continued)

(58) Field of Classification Search
CPC ...... G08B 21/02; G08B 21/22; G08B 25/016; G08B 23/00; G08B 31/00;
(Continued)

(56) References Cited

U.S. PATENT DOCUMENTS 7,979,279 B1    7/2011  McKinney
8,351,900 B2    1/2013  Lotvonen et al.
(Continued)

FOREIGN PATENT DOCUMENTS

WO    2010/116292    10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
(Continued)

*Primary Examiner* — Thomas Mullen
(74) *Attorney, Agent, or Firm* — Meunier Carlin & Curfman (57) ABSTRACT

Embodiments that are described herein provide improved methods and systems for predicting threatened POIs. In some embodiments, an automated location tracking system tracks the locations of one or more target individuals. The locations of the target individuals may be tracked, for example, by tracking the cellular phones of the targets, or using various other automated location tracking techniques. Based on the tracked locations, a prediction system anticipates the future locations of the targets. Over time, the system uses this information to progressively narrow down the list of possibly-threatened POIs.

18 Claims, 5 Drawing Sheets

(51) Int. Cl.
  *G08B 31/00* (2006.01)
  *H04W 4/029* (2018.01)
  *G06K 9/00* (2006.01)
  *H04W 4/021* (2018.01)
  *H04N 7/18* (2006.01)

(52) U.S. Cl.
  CPC ........... *H04W 4/021* (2013.01); *H04W 4/029* (2018.02); *G06K 2209/15* (2013.01); *H04N 7/18* (2013.01); *H05K 999/99* (2013.01)

(58) Field of Classification Search
  CPC ......... H04W 4/02–4/028; H04W 4/22; H04W 4/029; G06K 9/00288; H04N 7/18
  USPC ............... 340/539.13, 8.1; 455/404.1, 404.2; 701/425, 426
  See application file for complete search history.

(56) References Cited

U.S. PATENT DOCUMENTS

| | | |
|---|---|---|
| 2001/0027388 A1 | 10/2001 | Beverina et al. |
| 2003/0227392 A1 | 12/2003 | Ebert et al. |
| 2004/0199785 A1 | 10/2004 | Pederson |
| 2004/0223056 A1* | 11/2004 | Norris, Jr. ................. H04N 7/18 348/152 |
| 2006/0184483 A1 | 8/2006 | Clark et al. |
| 2008/0258880 A1 | 10/2008 | Smith et al. |
| 2009/0282217 A1 | 11/2009 | Fontenot et al. |
| 2010/0214117 A1* | 8/2010 | Hazzani ................. H04W 4/02 340/8.1 |
| 2010/0235314 A1 | 9/2010 | Nolan et al. |
| 2012/0028600 A1 | 2/2012 | Vallaire |
| 2012/0158289 A1 | 6/2012 | Bernheim Brush et al. |
| 2014/0171126 A1 | 6/2014 | Mayor et al. |
| 2015/0140097 A1 | 5/2015 | Goldfarb |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

"Cell Scanning and Catcher Detection in unnoticeable pocket size," NetHawk C2, Data sheet, version 1.4, EXFO, 2010, 4 pages.

Girardin, F., et al., "Detecting air travel to survey passengers on a worldwide scale," Journal of Location Based Services, 2010, 26 pages.

Kostrzewa, A., "Development of a man in the middle attack on the GSM Um-Interface," Master Thesis, 2011, 88 pages.

Meyer, U., et al., "On the Impact of GSM Encryption and Man-in-the-Middle Attacks on the Security of Interoperating GSM/UMTS Networks," proceedings of the 15th IEEE International Symposium on Personal, Indoor and Mobile Radio Communications, 2004, pp. 2876-2883.

Strobel, D., "IMSI Catcher," Seminararbeit, Ruhr-Universität Bochum, 2007, pp. 13-24.

Vedaldi, A., "An implementation of SIFT detector and descriptor," University of California at Los Angeles, 2007, 7 pages.

* cited by examiner

SYSTEM AND METHOD FOR PREDICTION OF THREATENED POINTS OF INTEREST

CROSS-REFERENCE TO RELATED APPLICATIONS

The present application claims is a continuation of, and claims the benefit of priority to, U.S. patent application Ser. No. 13/868,223, entitled "SYSTEM AND METHOD FOR PREDICTION OF THREATENED POINTS OF INTEREST," filed Apr. 23, 2013, whose disclosure is incorporated by reference herein.

FIELD OF THE DISCLOSURE

The present disclosure relates generally to security systems, and particularly to methods and systems for predicting locations of possible threats.

BACKGROUND OF THE DISCLOSURE

Security and law enforcement agencies invest considerable efforts and resources in anticipating and preventing illegitimate actions, such as terrorist attacks. In many cases, high-quality intelligence regarding an expected attack is important in focusing available resources, and thus increasing the chances of prevention and reducing unnecessary disruption of normal activities.

SUMMARY OF THE DISCLOSURE

An embodiment that is described herein provides a method, which includes defining one or more Points Of Interest (POIs) in a given geographical area. One or more target individuals, who are expected to carry out an illegitimate action at one or more of the POIs, are defined. Tracked locations of the target individuals in the given geographical area are received from an automated location tracking system. A predicted subset of the POIs, at which the target individuals are expected to carry out the illegitimate action, is progressively narrowed down over time using a computer, based on the tracked locations. The progressively narrowed-down predicted subset of the POIs is indicated to an operator.

In some embodiments, the illegitimate action includes a terrorist attack. In an embodiment, receiving the tracked locations includes receiving respective estimated locations of mobile communication terminals operated by the target individuals.

In some embodiments, narrowing down the predicted subset includes predicting respective trajectories of the target individuals in the given geographical area, and narrowing down the predicted subset of the POIs based on the predicted trajectories. In an embodiment, the one or more target individuals include only a single target individual, and narrowing down the predicted subset includes finding one or more of the POIs that are in proximity to a predicted trajectory of the target individual.

In another embodiment, the one or more target individuals include multiple target individuals, and narrowing down the predicted subset includes finding an intersection point of the predicted trajectories, and finding one or more of the POIs that are in proximity to the intersection point. In yet another embodiment, predicting the trajectories includes determining the predicted trajectories based on characteristic location profiles of the target individuals.

In a disclosed embodiment, narrowing down the predicted subset includes identifying a threatened region within the given geographical area, and finding one or more of the POIs that are located inside the threatened region. In another embodiment, narrowing down the predicted subset includes receiving an indication that one or more of the POIs are mentioned in monitored communication of the target individuals, and defining the subset of the POIs based on the indication. In yet another embodiment, narrowing down the predicted subset includes receiving a verification of an accuracy of the subset of the POIs, and modifying the subset based on the verification.

There is additionally provided, in accordance with an embodiment that is described herein, apparatus including a memory and a processor. The a memory is configured to hold a definition of one or more Points Of Interest (POIs) in a given geographical area, and a definition of one or more target individuals who are expected to carry out an illegitimate action at one or more of the POIs. The processor is configured to receive tracked locations of the target individuals in the given geographical area, to progressively narrow down, over time, based on the tracked locations, a predicted subset of the POIs at which the target individuals are expected to carry out the illegitimate action, and to indicate the progressively narrowed-down predicted subset of the POIs to an operator.

The present disclosure will be more fully understood from the following detailed description of the embodiments thereof, taken together with the drawings in which:

DETAILED DESCRIPTION OF EMBODIMENTS

Overview

Terrorist attacks are often aimed at urban locations such as shopping malls, bus and train stations, stadiums, tourist sites and other public places. Even when some intelligence is available regarding an imminent attack, in many practical cases it is difficult or impossible to simultaneously protect a large number of possible threatened Points of Interest (POIs). Moreover, protection often involves road closures, building evacuations, traffic diversions and other measures that disrupt the normal course of life and incur high economic cost. It is therefore highly desirable to reduce the number of POIs that are to be protected from the imminent attack.

Embodiments that are described herein provide improved methods and systems for predicting threatened POIs. In some embodiments, an automated location tracking system tracks the locations of one or more target individuals (referred to herein as "targets" for brevity) who are expected to carry out an illegitimate action, such as a terrorist attack. The locations of the target individuals may be tracked, for example, by tracking the cellular phones of the targets, or using various other automated location tracking techniques.

Based on the tracked locations, a prediction system anticipates the future locations of the targets. Over time, the system uses this information to progressively narrow down the list of possibly-threatened POIs. In some embodiments, the target identities and locations are verified over time using various techniques, and the system uses the verification results to enhance the process of narrowing down the list of threatened POIs.

The prediction system indicates the current list of threatened POIs to an operator, for example by issuing a sequence of real-time graphical alerts that gradually focus on a decreasing number of likely POIs. The alerts may indicate the most likely POIs with respective confidence levels, along with other relevant information regarding the POIs and/or the attack. The prediction system typically provides the alerts during a sufficient time frame prior to the attack (e.g., from 60-120 minutes before the attack), so as to enable effective prevention and/or response.

Based on this sort of progressive notification, authorities are able to assign available security resources to a relatively small of likely POIs, and thus increase the efficiency of use of these resources. Since security measures are applied to a small number of POIs, public disruptions such as road closures, evacuations and traffic diversions are minimized. Moreover, even if the attack is not prevented, focusing on a small number of POIs increases the efficiency of subsequent responsive actions.

System Description

Figure 1:
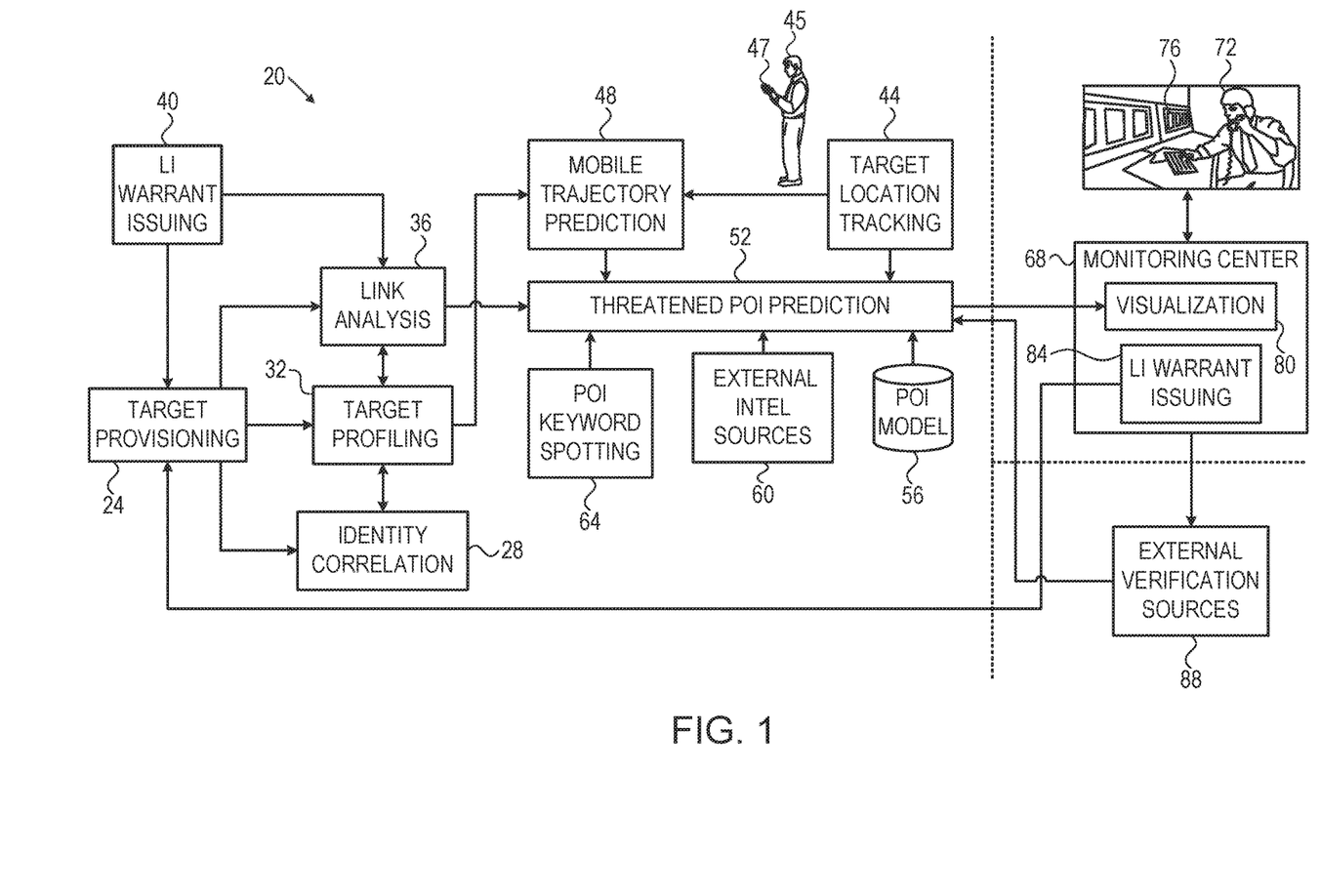
FIG. 1 is a block diagram that schematically illustrates a system for predicting threatened Points of Interest (POIs), in accordance with an embodiment that is described herein.

FIG. 1 is a block diagram that schematically illustrates a system 20 for predicting threatened Points of Interest (POIs), in accordance with an embodiment that is described herein. A system of this sort can be used, for example, by various security and law enforcement organizations for predicting, preventing and responding to terrorist attacks. In alternative embodiments, systems such as system 20 can also be used in other applications, such as crime prevention. The description that follows, however, focuses on anti-terrorist applications.

System 20 typically covers a certain geographical area, such as a city. The system attempts to identify Points of Interest (POIs) that are possibly threatened by an imminent terrorist attack to be conducted by one or more predefined target individuals ("targets"). Typically, system 20 receives tracked locations of the targets, which are obtained by estimating the locations of mobile communication terminals (e.g., cellular phones) that the targets operate. Based on the tracked locations, the system predicts the future trajectories of the targets, and attempts to identify the threatened POIs from the estimated trajectories.

In the present example, a target provisioning unit 24 specifies the identities of the targets. In some cases, tracking a target individual requires an issued judicial warrant. Thus, in some embodiments the system comprises an automated Lawful Interception (LI) warrant issuing module 40. In these embodiments, system 20 tracks only targets for which a valid warrant has been issued. In alternative embodiments, where a warrant is not a requirement, module 40 can be omitted.

A location tracking system 44 tracks the locations of the provisioned targets 45 in the geographical area, e.g., by tracking the locations of mobile communication terminals 47 operated by the targets 45 in a wireless network. Various techniques for tracking mobile terminals in wireless networks are known in the art, and any suitable tracking technique can be used for implementing system 44.

In one example embodiment, system 44 estimates the locations of the targets by monitoring the communication of the targets' cellular phones in the cellular network, and identifying the cells that currently serve the phones. The identity of the serving cell (often referred to as CELL_ID) is indicative of the phone location. In an embodiment, system 44 improves the accuracy of CELL_ID-based location using suitable numerical calculations.

An example technique for improved-accuracy location tracking is described in U.S. patent application Ser. No. 12/840,233, which is assigned to the assignee of the present patent application and whose disclosure is incorporated herein by reference. This technique improves the location accuracy based only on a database of base station locations, which can be obtained from the cellular service provider. As such, the technique is low-cost and simple to implement.

In some embodiments, system 20 comprises several units that enhance the information regarding the targets—in the present example an identity correlation unit 28, a target profiling unit 32 and a link analysis unit 36.

Identity correlation unit 28 correlates multiple identifiers that identify the targets and/or their mobile communication terminals. Typically, a correlation between identifiers is established by detecting that the identifiers are used in approximately the same location at approximately the same time. The correlations are typically filtered, e.g., repeated at different locations and/or times, in order to remove false correlations.

Identifiers that are suitable for correlation may be obtained from a variety of location/identifier sources, some of which may be external to system 20. Possible identifiers that can be correlated by unit 28 may comprise, for example:

Car license plate numbers obtained from a License Plate Recognition (LPR) system operated in the city.

Face images obtained by a face recognition system. Images of this sort may be obtained, for example, by performing analytics over Closed Circuit Television (CCTV) video surveillance of individuals in public places or even inside vehicles. The captured face images may be compared, for example, with a database of face images of known terrorists.

Identifiers of mobile communication terminals, such as International Mobile Subscriber Identity (IMSI), Mobile Station International Subscriber Directory Number (MSISDN) or International Mobile Equipment Identity (IMEI). Such identifiers may be obtained, for example, from IMSI detection sensors (sometimes referred to as "IMSI catchers") deployed, for example, at or near POIs. Mobile terminal identifiers may also be obtained by target-centric real-time cellular location tracking, e.g., obtained from cellular service providers.

Credit card identifiers, obtained, for example, from Points of Sale (POS) and Automatic Teller Machines (ATM).

Internet Protocol (IP) addresses of mobile computing devices, obtained, for example, from IP geo-location (e.g., laptop location, Internet café access, or Wi-Fi access point location).

Fixed phone identifiers obtained from Public Switched Telephone Network (PSTN) geo-location.

Target locations and associated identifiers received from external Monitoring Centers (MC), Law Enforcement Agencies (LEA) or security agencies.

Other identifiers obtained from communication monitoring, such as names, identities or nicknames in social networks or other applications, e-mail addresses, and many others.

For example, a CCTV system located at a certain POS may identify the license plate number of a car, obtain video footage that enables face recognition of the passengers, at the same time obtain the IMSI of the mobile phones operating in the car, and obtain the credit card number used at the POS. All these identifiers may be correlated and associated with the same target or group of targets. Alternatively, any other suitable technique can be used for obtaining and correlating identifiers that are indicative of the targets.

Other example techniques for correlating identifiers, which can be used by unit 28, are described, for example, in U.S. Pat. No. 7,882,217, and U.S. patent application Ser. Nos. 12/608,474, 13/187,438 and 13/253,935, which are all assigned to the assignee of the present patent application and whose disclosures are incorporated herein by reference.

In some embodiments, system 20 comprises a target profiling unit 32, which constructs characteristic location profiles for the targets. The location profile of a given target may comprise, for example, the characteristic location of the target over time, for example over the hours of the day or over the days of the week or month. The profile may indicate regular habits and behaviors of the target as they are exhibited by its location.

Typically, unit 32 constructs and continuously updates the location profiles of the targets based on the various location sources described above. Example techniques for location profiling, which can be used by unit 32, are described, for example, in U.S. patent application Ser. Nos. 12/628,089 and 13/283,532, which are all assigned to the assignee of the present patent application and whose disclosures are incorporated herein by reference.

In some embodiments, system 20 uses the location profiles produced by unit 32 in the process of identifying possible POIs that are threatened by the targets. In some embodiments, the profiling process of unit 32 may discover additional targets, e.g., additional members in a terrorist group, by identifying additional individuals whose location profiles are correlative to those of known targets.

In some embodiments, link analysis unit 36 identifies relationships between different targets. Unit 36 may identify the relationships, for example, by identifying correlations between the target location profiles produced by unit 32. Additionally or alternatively, unit 36 may receive multiple financial records and telecommunication records from any suitable sources (e.g., the location sources described above), including IP and cellular records such as Web browsing records, e-mails, social network records and many others). Unit 32 may use this information to establish relationships between targets.

Using the link analysis process, unit 36 may identify additional targets based on their relationships with known targets, and/or verify new targets identified by profiling unit 32. Example link analysis techniques that can be used by unit 36 are described, for example, in U.S. patent application Ser. Nos. 12/888,445, 12/964,891 and 13/244,462, which are all assigned to the assignee of the present patent application and whose disclosures are incorporated herein by reference.

Typically, unit 36 applies link analysis to the various possible target identities as they are continuously received from correlation unit 28, and to the various possible identifiers in the terrorist group as they are being discovered by profiling unit 32.

System 20 comprises a mobile trajectory prediction unit 48, which predicts the future location trajectories of the targets' mobile devices (e.g., mobile phone or GPS receiver/modem) based on the available information described above. The trajectory of a given target, relative to its current location, is typically expressed in terms of direction and velocity. In an embodiment, unit 48 estimates the trajectory in real-time, based on past location measurements of this target. In predicting the trajectory, unit 48 may also consider nearby POIs and road information. Unit 48 may also consider the location profile produced for this target by unit 32.

System 20 comprises a threatened POI prediction unit 52, which identifies a subset of POIs that are most likely threatened by the tracked targets. Unit 52 receives the locations of the tracked targets from unit 44, the predicted trajectories of the targets from unit 48, and the identified relationships between targets from unit 36.

In addition, prediction unit 52 receives information regarding the POIs from a POI model database 56. Database 56 comprises information such as POI locations, outdoor and indoor modeling of POIs, opening hours, entrances, exits, parking areas, contact persons in case of emergency, semantic meaning, common names for the POIs, and/or any other suitable information. Database 56 may be stored in any suitable memory device. Accurate modeling is important for prediction accuracy of unit 52, as well as for improving the response in case the attack ultimately occurs.

Based on the location and trajectory information of the targets and the POI information, unit 52 attempts to predict which of the POIs are most likely to be attacked by the target at any point in time. As will be explained and demonstrated below, the prediction of unit 52 is performed and updated in real-time, in order to progressively narrow down the list of likely POIs as the attack time approaches. The progressive POI prediction process may be performed, for example, from several hours before the planned attack time, through the time the attack occurs or is prevented, and during the subsequent responsive action.

In some embodiments, prediction unit 52 receives inputs regarding the POIs and/or targets from additional sources. In the present example, system 20 comprises a keyword spotting unit 64, which analyzes the content (e.g., intercepted speech of voice calls or intercepted text of e-mails, text messages, chat or social network sessions) conveyed by the communication of the communication terminals of the tracked targets. Unit 64 applies keyword spotting or natural language analysis to the content, in an attempt to detect references to the POIs (e.g., POI names or descriptions) in the analyzed content. Identifying a reference to a given POI by a target will typically cause unit 52 to increase the confidence that this POI is indeed threatened.

As another example, prediction unit 52 may receive input regarding the POIs or targets from external intelligence sources 60, such as, for example, positive identifications of targets by field agents, or information obtained from information sharing with other security or intelligence agencies.

Prediction unit 52 may apply various methods for predicting the subset of threatened POIs. For example, in case of a single target acting alone, unit 52 may intersect the anticipated trajectory of the target with nearby POIs and with threatened POIs that were obtained from external intelligence sources and/or keyword spotting.

In case of multiple targets acting together and arrive from different locations, unit 52 may find the intersection of the anticipated trajectories of the targets. Relative to the intersection point, unit 52 may identify adjacent POIs and threatened POIs that were provided by external intelligence sources and/or keyword spotting. Additionally or alternatively, unit 52 may predict the threatened POIs using any other suitable method.

As a by-product of this process, unit 52 may output an anticipated time and place of a meeting between targets. Certain aspects of prediction of future meetings are described, for example, in U.S. patent application Ser. No. 12/708,558, which is assigned to the assignee of the present patent application and whose disclosure is incorporated herein by reference.

System 20 typically issues alerts that indicate the predicted subset of threatened POIs. Each alert typically indicates information such as the attack details, predicted time of the attack, the estimated location (one or more POIs and area), the type of the attack, the identities of the involved terrorists, the probability of occurrence of the attack, the confidence level of the assessment, and/or any other suitable information.

The alerts are provided to a monitoring center 68, in which a visualization unit 80 displays the alerts to an operator 72 on a display 76. Typically, the alerts are displayed graphically on a map of the relevant geographical area. In some embodiments, the monitoring center comprises a LI warrant issuing unit 84 (either in addition to or instead of unit 40) that issues warrants for tracking targets to target provisioning unit 24.

Figure 3A:
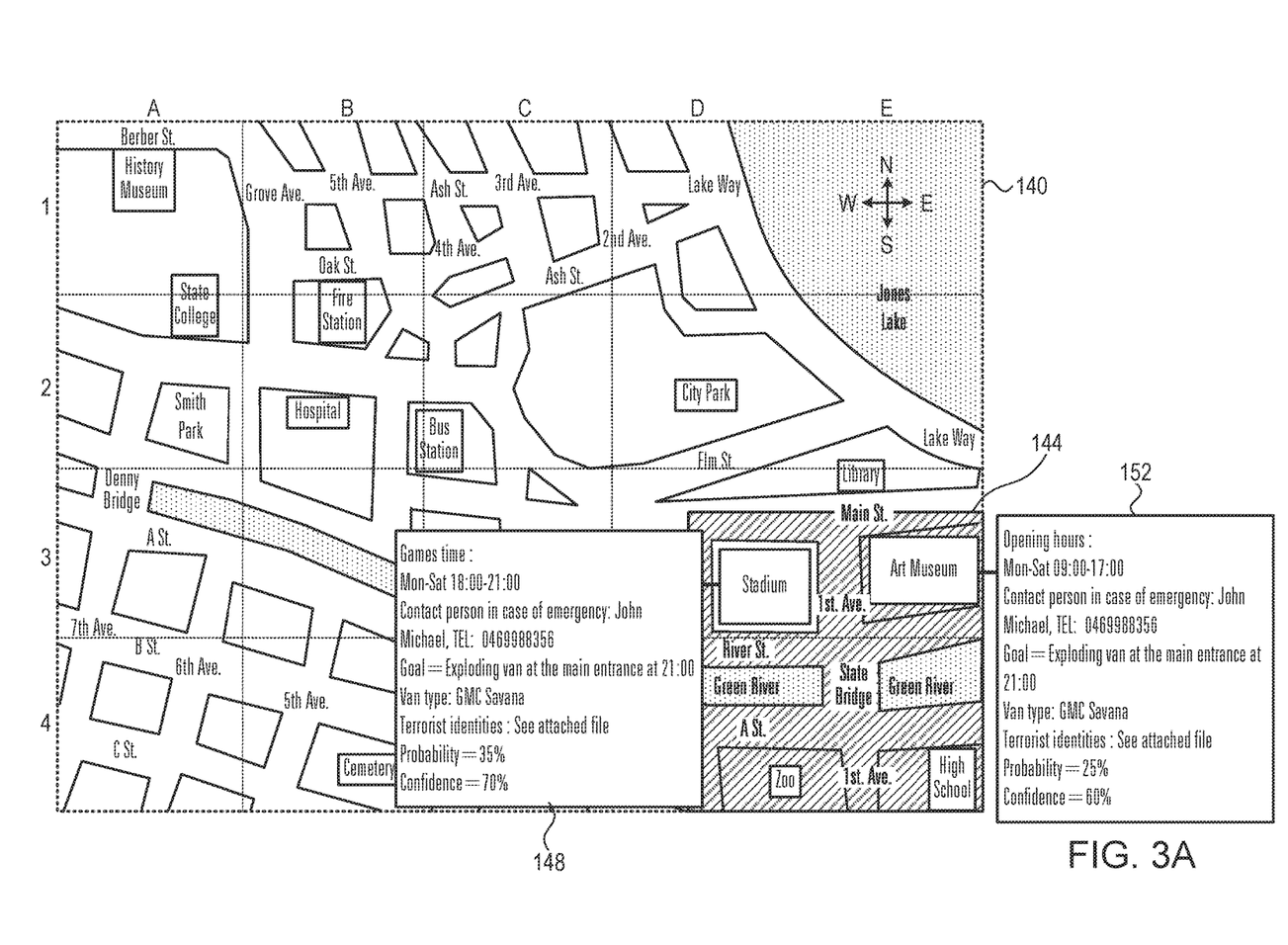
FIGS. 3A-3C are schematic, pictorial illustrations showing example graphical output of a system for predicting threatened POIs, in accordance with an embodiment that is described herein.
Figure 3B:
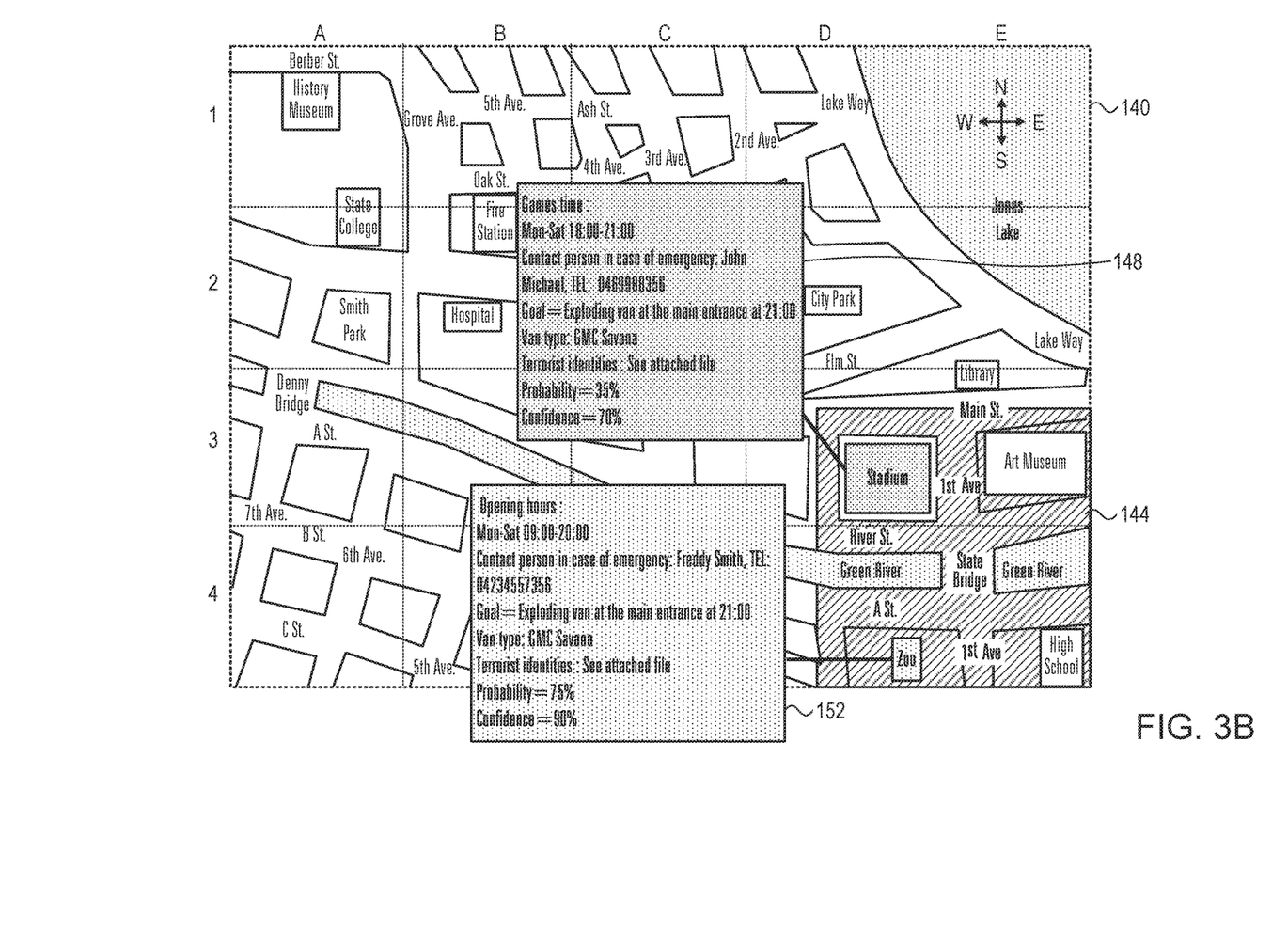
Figure 3C:
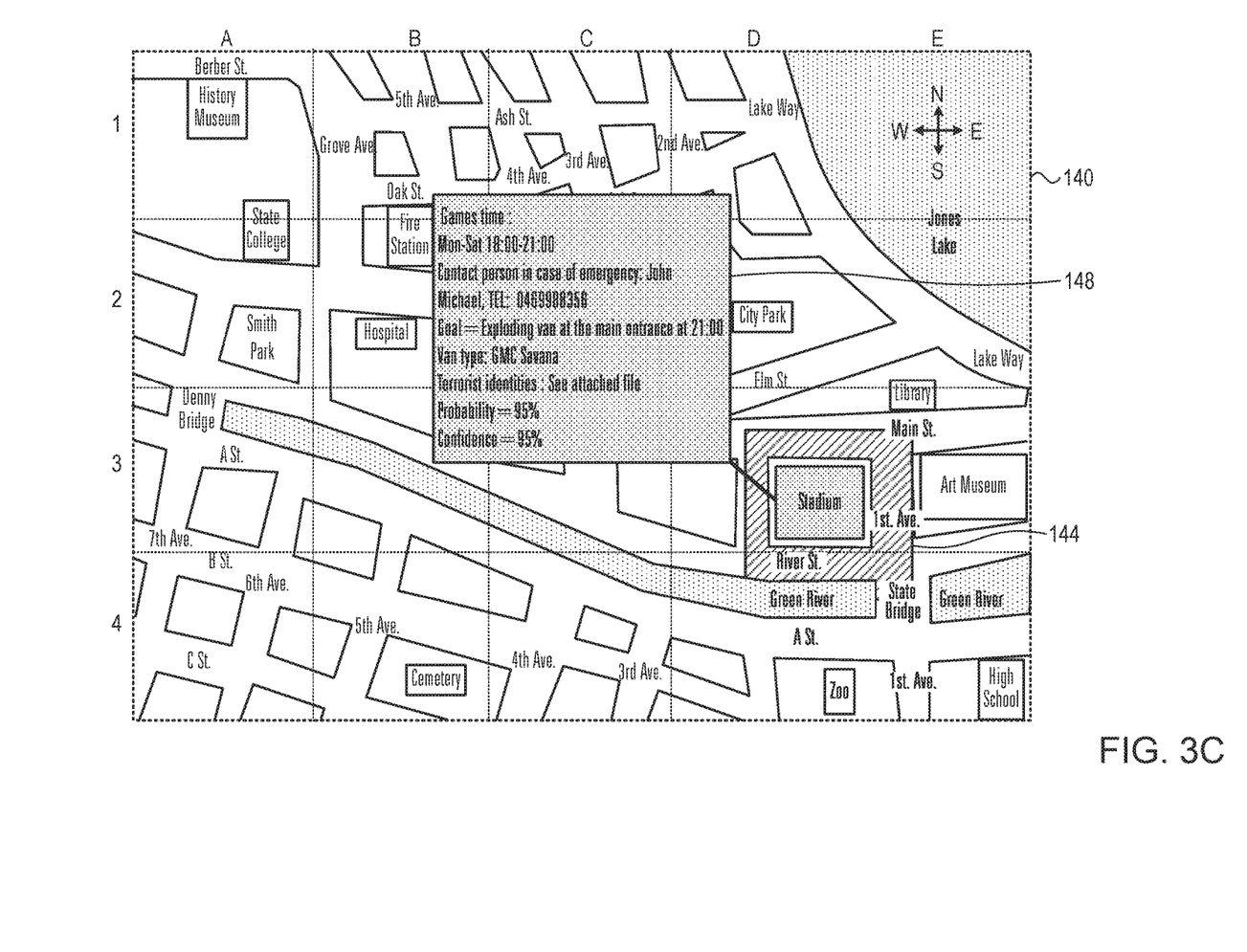

In some embodiments, prediction unit 52 produces and outputs to the monitoring center a sequence of alerts, which progressively narrow down the subset of likely threatened POIs. In a typical flow, the subset of threatened POIs is initially large since at that time (e.g., hours before the time of attack) the intelligence is still general and the prediction of target trajectories is relatively inaccurate. Later in time, e.g., half an hour before the time of attack, system 20 has access to higher-quality intelligence and location information, and is therefore able to improve the prediction accuracy and narrow down the subset of POIs. Minutes before the attack, it may be possible to reduce the subset of threatened POIs to only a few POIs, or even a single POI. An example scenario of this sort is shown in FIGS. 3A-3C below. The time frame before the attack during which alerts are provided may be configured by the operator.

In some embodiments, system 20 applies various verification measures for verifying the correctness and accuracy of the threatened POI prediction. In the present example, monitoring center 68 activates one or more external verification sources 88, whose outputs are fed back to prediction unit 52. By modifying the POI prediction based on the verification results, system 20 is able to improve the prediction accuracy and reduce the likelihood of false alarms.

One example form of verification is referred to as "crowd intelligence." In such a scheme, the monitoring center invokes a call center to transmit a broadcast Short Messaging Service (SMS) or voice message to cellular phone users located in the vicinity of a certain POI. The message requests the recipients to report suspicious events they notice (e.g., person, vehicle or activity) using text and/or images. In response to this broadcast message, the call center receives text and/or images from cellular phone users, which report suspicious events. The monitoring center may analyze the responses, for example using text analysis, LPR or face recognition techniques, and feedback any relevant information regarding the targets or POIs to unit 52.

Unit 52 may modify the POI prediction based on the verification results. For example, if the responses show that a known target or vehicle is indeed spotted near a given POI, unit 52 may increase the confidence that this POI is threatened.

Other possible forms of external verification may comprise, for example, miniature Unmanned Aerial Vehicles (UAV) that acquire video images either indoor or outdoor, video footage from police helicopters, video images from CCTV systems installed on streets or in public transport vehicles, or any other suitable sensor. The sensor input may be analyzed and fed back to unit 52, either manually, semi-manually or automatically.

In some embodiments, unit 52 is also provided with statistical or other analysis of past terrorist attacks, and takes this information into consideration when predicting the threatened POIs.

The focused POI prediction provided by system 20 can be used by authorities for coordinating various preventive measures. In particular, such preventive actions can be focused and concentrated around the subset of threatened POIs, and thus reduce public disruption and wasting of resources. For example, authorities may send broadcast SMS messages to mobile phones in the vicinity of the threatened POIs with instructions for evacuation or other action. As another example, public transport operators in the vicinity of the threatened POIs may be instructed selectively. As yet another example, cellular communication may be jammed or monitored at or near the threatened POIs. First responders (e.g., police or ambulance services) can be dispatched on time and with greater accuracy.

The system configuration of system 20 shown in FIG. 1 is an example configuration, which is chosen purely for the sake of conceptual clarity. In alternative embodiments, any other suitable system configuration can also be used. The elements of system 20 may be implemented in hardware, in software, or using a combination of hardware and software elements. In some embodiments, certain functions of system 20 can be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Response to Attacks

In some cases, the prevention measures fail and the terrorist attack takes place. In these scenarios, the focused POI prediction provided by system 20 helps to improve the quality and speed of responsive actions that are taken by authorities following the attack.

For example, when the authorities deploy a tactical Command and Control (C2) system for crisis management, which manages the post-attack responsive actions, system 20 may be connected as one of the sensors that provide input to this C2 system.

Moreover, POI database 56 of system 20 can be made accessible to the tactical C2 system, and thus provide information that is valuable to the responsive actions. For example, in some embodiments database 56 comprises a hierarchal model of POI data in various levels, ranging from the national level (e.g., on a scale of 1:100000), city or local authority level (e.g., on a scale of 1:10000), neighborhood level (e.g., on a scale of 1:2500), complex or campus level (e.g., on a scale of 1:500), building level (e.g., on a scale of 1:50), and room-indoor level (e.g., on a scale of 1:5).

At each level, POI data for the database is typically obtained from different sources. At the national level, for example, information regarding historic monuments (such as location, opening hours, capacity, type, size, plan, entrance locations, manager identity and contact information) can be obtained from the municipality. Online information from inside the monument, on the other hand, can be obtained from security cameras and crowd sourcing. This information can provide considerable value to responsive actions following a terrorist attack.

POI Prediction Method Description

Figure 2:
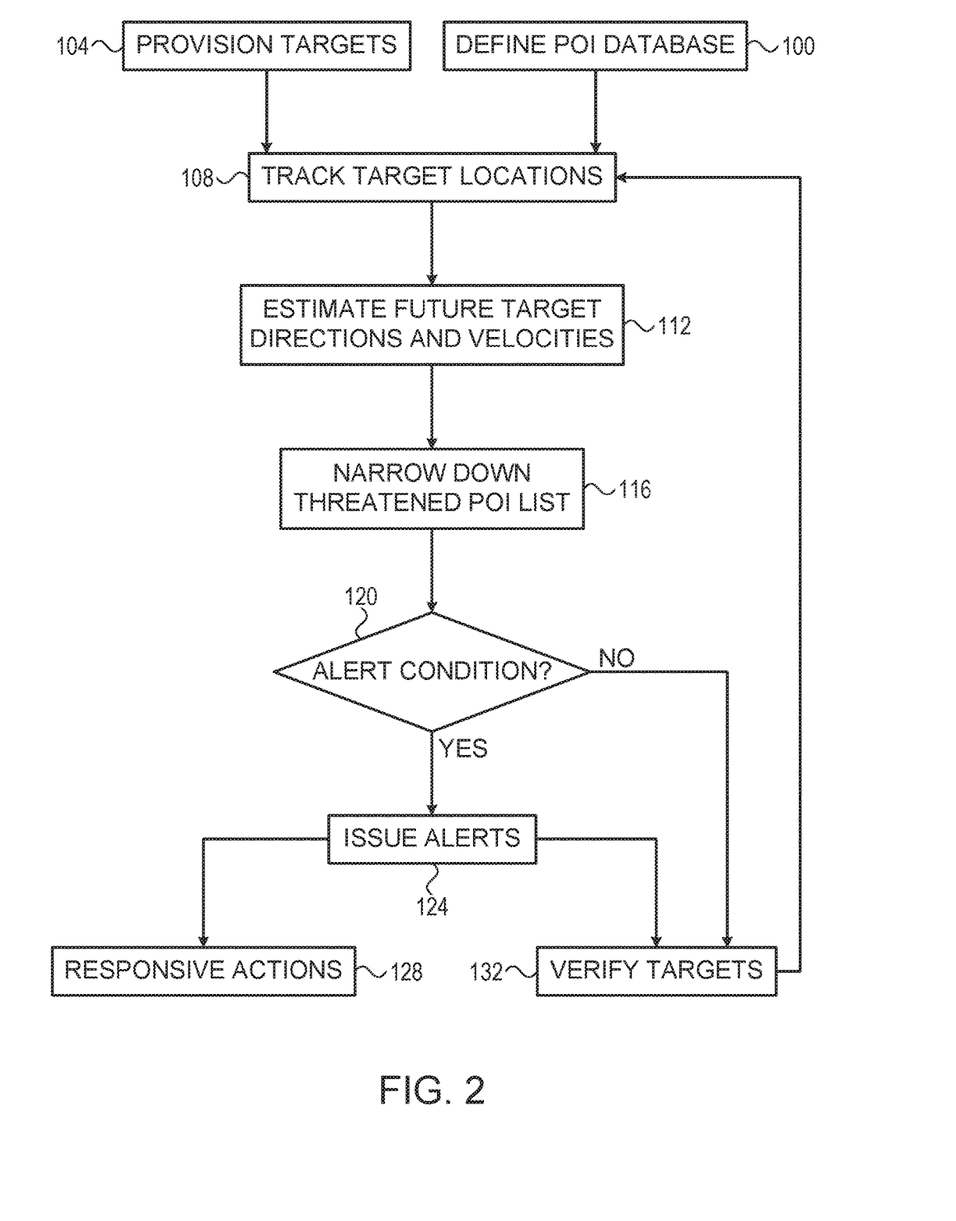
FIG. 2 is a flow chart that schematically illustrates a method for predicting threatened POIs, in accordance with an embodiment that is described herein.

FIG. 2 is a flow chart that schematically illustrates a method for predicting threatened POIs, in accordance with an embodiment that is described herein. The method begins by providing system 20 with a POI database (e.g., database 56 of FIG. 1) in a certain geographical area, at a POI definition step 100. Target provisioning unit 24 predefines one or more target individuals ("targets") that are suspected of preparing for a terrorist attack, at a target provisioning step 104.

Location tracking unit 44 tracks the locations of the targets, at a location tracking step 108. Trajectory prediction unit 48 predicts the future trajectories (directions and velocities) relative to the current target locations, at a trajectory prediction step 112.

Based on the POI database and on the locations and trajectories of the targets, POI prediction unit 52 narrows down the list of POIs to a partial subset of the POIs that are most likely threatened by the attack, at a POI prediction step 116.

Unit 52 checks whether an alert condition is met, at a checking step 120. For example, unit 52 may check whether the probability of attack is above a certain threshold or if a certain time has elapsed since the previous alert. If an alert is to be issued, unit 52 sends one or more alerts to monitoring center 68, at an alerting step 124. The alerts indicate the subset of threatened POIs as predicted by unit 52, along with other relevant information regarding the attack, the targets and/or threatened POIs.

System 20 verifies the POI prediction using any of the above-described verification sources or sensors, at a verification step 132. If necessary, unit 52 modifies the POI prediction based on the verification results.

The method then loops back to step 108 above, and system 20 continues to track the targets and progressively update the POI and narrow down the subset of threatened POIs. If the attack was not prevented, appropriate responsive actions are taken, at a response step 128.

Example Prediction Scenario

FIGS. 3A-3C are schematic, pictorial illustrations showing an example sequence of graphical alerts that are displayed by system 20 to operator 72 of monitoring center 68, in accordance with an embodiment that is described herein. The figures demonstrate the process of progressively focusing on a smaller area with a decreasing number of threatened POIs as the imminent attack approaches.

In this example scenario, FIG. 3A shows an alert issued at 8 PM, one hour before the planned attack time. The alert is displayed graphically on a map 140. A threatened region 144 is marked on the map. Two POIs (a stadium and an art museum) inside region 144 are predicted as threatened, and system 20 displays information windows 148 and 152 regarding these POIs. The displayed information comprises relevant information regarding the threatened POI, the attack and/or the targets.

In some embodiments, system 20 uses a color scheme for grading the severity of the alerts. For example, when the alert has low severity (e.g., a long time before the attack, or low confidence or probability of occurrence), the threatened POI and the corresponding information window are colored blue. When the alert has medium severity, the threatened POI and the corresponding information window are colored orange. When the alert has high severity (e.g., immediately before the attack, or high confidence or probability of occurrence), the threatened POI and the corresponding information window are colored red.

In this example, at this stage, the two threatened POIs and information windows are still colored blue.

FIG. 3B shows an alert issued forty-five minutes later, at 8:45 PM, fifteen minutes before the planned attack time. At this stage, the severity of the alert regarding the stadium has risen to high, and the stadium and its corresponding information window 148 are colored red. A new alert, having low severity, is issued for the zoo that is also inside region 144. The zoo and its corresponding information window 152 are now colored green.

FIG. 3C shows an alert issued ten minutes later, at 8:55 PM, only five minutes before the planned attack time. At this final stage, the size of threatened region 144 decreased, and only one threatened POI remains—The stadium. The severity of the alert regarding the stadium is high, and the stadium and its corresponding information window 148 are therefore colored red. The alert regarding the zoo is removed.

Although the embodiments described herein mainly address prediction of POIs that are threatened by terrorist attacks, the principles of the present disclosure can also be used for predicting POIs that are threatened by other illegitimate actions, such as crimes.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus comprising:
an automated location tracking system, which is configured to track locations of mobile communication terminals operated by one or more predetermined target individuals in a wireless network as the one or more predetermined target individuals move about a given geographical area over time, wherein the one or more predetermined target individuals are individuals who are suspected of preparing for a terrorist attack;
a processor, which is configured to:
receive the tracked locations of the one or more predetermined target individuals from the automated location tracking system;

predict future location trajectories of the mobile communication terminals, in real-time, based on the tracked locations of the one or more predetermined target individuals;

receive information regarding a plurality of Points of Interest (POIs), wherein the information is received from a POI model database stored on one or more memory devices;

predict a subset of the POIs that are threatened by the one or more predetermined target individuals, the prediction being based on the tracked locations of the one or more predetermined target individuals, the predicted future location trajectories of the one or more predetermined target individuals and the received POI location information; and indicate the predicted subset of the POIs to an operator upon the subset being predicted or updated.

2. The apparatus according to claim 1, wherein the one or more predetermined target individuals comprise only a single target individual, and wherein the processor is configured to update the predicted subset by finding one or more of the POIs of the predicted subset that are in proximity to a predicted future location trajectory of the single target individual.

3. The apparatus according to claim 1, wherein the one or more predetermined target individuals comprise multiple target individuals, and wherein the processor is configured to update the predicted subset by finding an intersection point of the predicted future location trajectories, and finding one or more of the POIs of the predicted subset that are in proximity to the intersection point.

4. The apparatus according to claim 1, wherein the processor is configured to update the predicted subset by identifying a threatened region within the given geographical area, and finding one or more of the POIs of the predicted subset that are located inside the threatened region.

5. The apparatus according to claim 1, wherein the processor is configured to receive an indication that one or more of the POIs are mentioned in monitored communication of the one or more predetermined target individuals, and to define the subset of the POIs based on the indication.

6. The apparatus according to claim 1, wherein the processor is configured to receive a verification of an accuracy of the subset of the POIs, and to modify the subset based on the verification.

7. A method comprising:

tracking, by an automated location tracking system, locations of mobile communication terminals operated by one or more predetermined target individuals in a wireless network as the one or more predetermined target individuals move about a given geographical area over time, wherein the one or more predetermined target individuals are individuals who are suspected of preparing for a terrorist attack;

predicting, by one or more processing units, future location trajectories of the mobile communication terminals, in real-time, based on the tracked locations of the one or more predetermined target individuals;

receiving, by the one or more processing units, information regarding a plurality of Points of Interest (POIs), wherein the information is received from a POI model database stored on one or more memory devices;

predicting, by the one or more processing units, a subset of the POIs that are threatened by the one or more predetermined target individuals, the prediction being based on the tracked locations of the one or more predetermined target individuals, the predicted future location trajectories of the one or more predetermined target individuals and the received POI location information; and indicating the predicted subset of the POIs to an operator upon the subset being predicted or updated.

8. The method according to claim 7, wherein the one or more predetermined target individuals comprise only a single target individual, and wherein updating the predicted subset comprises finding one or more of the POIs of the predicted subset that are in proximity to a predicted future location trajectory of the single target individual.

9. The method according to claim 7, wherein the one or more predetermined target individuals comprise multiple target individuals, and wherein updating the predicted subset comprises finding an intersection point of the predicted future location trajectories, and finding one or more of the POIs of the predicted subset that are in proximity to the intersection point.

10. The method according to claim 7, wherein updating the predicted subset comprises identifying a threatened region within the given geographical area, and finding one or more of the POIs of the predicted subset that are located inside the threatened region.

11. The method according to claim 7, wherein predicting the predicted subset comprises receiving an indication that one or more of the POIs are mentioned in monitored communication of the one or more predetermined target individuals, and defining the subset of the POIs based on the indication.

12. The method according to claim 7, wherein updating the predicted subset comprises receiving a verification of an accuracy of the subset of the POIs, and modifying the subset based on the verification.

13. A non-transitory computer readable medium having instructions stored thereon that, when executed by a computing system, cause the computing system to at least:

track locations of mobile communication terminals operated by one or more predetermined target individuals in a wireless network as the one or more predetermined target individuals move about a given geographical area over time, wherein the one or more predetermined target individuals are individuals who are suspected of preparing for a terrorist attack;

predict future location trajectories of the mobile communication terminals, in real-time, based on the tracked locations of the one or more predetermined target individuals;

receive information regarding a plurality of Points of Interest (POIs), wherein the information is received from a POI model database stored on one or more memory devices;

predict a subset of the POIs that are threatened by the one or more predetermined target individuals, the prediction being based on the tracked locations of the one or more predetermined target individuals, the predicted future location trajectories of the one or more predetermined target individuals and the received POI location information; and indicate the predicted subset of the POIs to an operator upon the subset being predicted or updated.

14. The non-transitory computer readable medium according to claim 13, wherein the one or more predetermined target individuals comprise only a single target individual, and wherein updating the predicted subset comprises finding one or more of the POIs of the predicted subset that are in proximity to a predicted future location trajectory of the single target individual.

15. The non-transitory computer readable medium according to claim 13, wherein the one or more predetermined target individuals comprise multiple target individuals, and wherein updating the predicted subset comprises finding an intersection point of the predicted future location trajectories, and finding one or more of the POIs of the predicted subset that are in proximity to the intersection point.

16. The non-transitory computer readable medium according to claim 13, wherein updating the predicted subset comprises identifying a threatened region within the given geographical area, and finding one or more of the POIs of the predicted subset that are located inside the threatened region.

17. The non-transitory computer readable medium according to claim 13, wherein predicting the predicted subset comprises receiving an indication that one or more of the POIs are mentioned in monitored communication of the one or more predetermined target individuals, and defining the subset of the POIs based on the indication.

18. The non-transitory computer readable medium according to claim 13, wherein updating the predicted subset comprises receiving a verification of an accuracy of the subset of the POIs, and modifying the subset based on the verification.

* * * * *